United States Patent [19]

Davis

[11] 4,250,532

[45] Feb. 10, 1981

[54] ELECTRONIC OVERCURRENT DETECTION AND TRIPPING CIRCUIT

[75] Inventor: Lee A. Davis, Audubon, N.J.

[73] Assignee: Gould Inc., Rolling Meadows, Ill.

[21] Appl. No.: 11,388

[22] Filed: Feb. 12, 1979

[51] Int. Cl.³ .............................................. H02H 3/08
[52] U.S. Cl. .................................................... 361/96
[58] Field of Search .................................... 361/93-98

[56] References Cited

U.S. PATENT DOCUMENTS

| 3,803,455 | 4/1974 | Willard | 361/96 X |
| 4,004,201 | 1/1977 | De Puy | 361/96 |
| 4,041,540 | 8/1977 | Kampf et al. | 361/96 X |
| 4,131,929 | 12/1978 | Moran | 361/97 X |

*Primary Examiner*—Harry E. Moose, Jr.

*Attorney, Agent, or Firm*—Ostrolenk, Faber, Gerb & Soffen

[57] ABSTRACT

An electronic overcurrent detection and tripping circuit for circuit breakers is disclosed. The circuit includes an instantaneous trip circuit, a short time delay trip circuit, a long time delay trip circuit and a ground trip circuit. Each of the circuits is provided with adjustable ranges which can be set by suitable tap blocks or the like. A novel power supply is provided for the circuit which incorporates a unique series-connected zener diode and sensing resistor. The power supply circuit also provides sufficient power for tripping a magnetic latch of the circuit breaker whose current is being monitored. Each of the circuit functions can be disabled for purposes of tests by simply placing the function tap block pin in an appropriate test position.

7 Claims, 2 Drawing Figures

ELECTRONIC OVERCURRENT DETECTION AND TRIPPING CIRCUIT

BACKGROUND OF THE INVENTION

This invention relates to an electronic breaker trip device for controlling the tripping of a circuit breaker, and more particularly relates to a novel solid state circuit arrangement for an electronic trip device.

Electronic trip devices are generally well known and are shown, for example, in U.S. Pat. Nos. 3,766,436; 3,792,313; 3,801,872; 3,914,667 and 3,970,899, all assigned to the assignee of this application.

In arrangements of the prior art, a relatively high power supply current is required by the circuitry. To overcome this requirement, relatively complicated approaches have been taken to establish the power supply. In a first approach, for example, two controlled rectifiers are connected in series with the primary of each intermediate current transformer which monitors the circuit breaker current. A zener diode is then placed in series with each controlled rectifier gate. Each alternate cycle of the signal current then generates a high voltage across each controlled rectifier for a short portion of the cycle to prevent transformer saturation and damage. This high voltage is then bled off to establish the power supply.

The major disadvantage of this approach is that many electronic components are needed to establish the power supply (including, for example, six controlled rectifiers and six zener diodes for a three-phase system) and this large component count decreases reliability and increases cost.

A second approach which has been taken is to provide a separate set of primary current sensors to generate the power for the circuit. In addition to the added cost of the extra sensors, the power supply now becomes sensitive to transients produced in the primary current.

BRIEF DESCRIPTION OF THE PRESENT INVENTION

The present invention provides a novel circuit configuration for an electronic breaker trip device which requires only a relatively low power supply current and thus decreases the number of components necessary and increases the reliability of the circuit, and at the same time renders the circuit relatively immune to damage from a non-sinusoidal current wave form. As a consequence of the more stable power supply, the timing and pickup circuit which are used in the trip device are more accurate. In particular, a low circuit supply current is required in the novel arrangement of the present invention because of the use of high impedance integrated circuits in the electronic breaker trip device with low supply current requirements. Moreover, the circuit power supply is a relatively simple circuit using a series zener diode and series transistor regulator to reduce cost and increase reliability.

A further feature of the present invention is the use of a single set of primary current sensing transformers to provide both signal and power supply current.

Higher pickup and timing accuracy is also obtained through the extended use of high input impedance integrated circuits, whereby the loading effect of the detectors on the pickup and timing circuits is greatly reduced. This also enables greater pickup accuracy because smaller and more accurate capacitors can be used. Similarly, the timing accuracy is increased.

As a further feature of the invention, each function within the circuit including long time fault current measuring, short time fault current measuring, instantaneous fault current measuring and ground fault current measuring can be effectively disabled, one at a time, for purposes of testing by simply placing the tap block pin of the particular function in an appropriate test position. Thus, the operator is able to test each function independently and be assured of that function's condition.

DETAILED DESCRIPTION OF THE DRAWINGS

Figure 1:
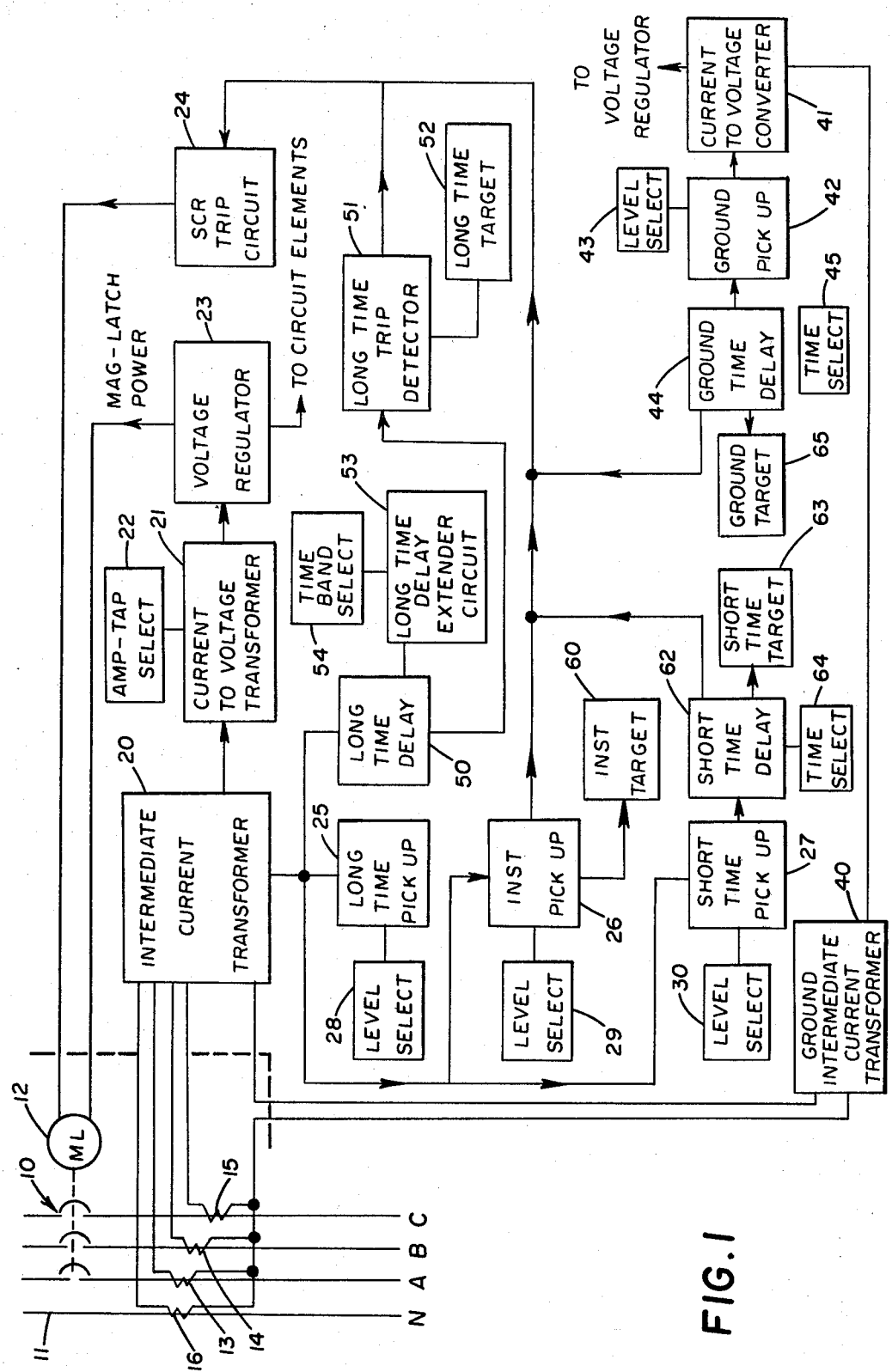
FIG. 1 is a schematic block diagram of the novel electronic breaker trip device of the present invention.

Referring first to FIG. 1, there is illustrated a power circuit breaker 10 which is a three-phase circuit breaker having phases A, B and C. Phases A, B and C are also associated with a neutral wire conductor 11. The circuit breaker 10 has a magnetic latch 12 associated therewith, where the magnetic latch 12 can be of the type disclosed in copending application Ser. No. 921,827, filed July 3, 1978, entitled CIRCUIT BREAKER MAGNETIC TRIP DEVICE, in the names of Challis Clausing and Einar H. Frederickson.

The trip device of the invention is arranged to receive information about the current flowing in the circuit breaker 10 from sensors mounted in the breaker. These sensors include the current transformer windings 13, 14 and 15 in phases A, B and C, respectively, as well as the current transformer winding 16 in the neutral wire 11. If the current in any of phases A, B, C or neutral N rises above some preset level or prescribed length of time, the trip device will then send a suitable trip signal to the magnetic latch 12 or to some other suitable tripping arrangement. The release of the magnetic latch 12 will then enable compressed springs or the like to forcibly open the contacts of the circuit breaker 10.

The primary function of the trip device to be disclosed is to sense the current through the circuit breaker or through the neutral and provide a trip signal if certain conditions exist. Thus, if the current rises above some preset level, the time delay between the sensing of the overcurrent condition and the production of a trip signal will depend upon the amount of the overcurrent and the settings of the different time delay zones of the trip device. These zones are referred to as long time, short time and instantaneous zones. In addition, the ground or neutral current is also sensed and a trip signal is provided if ground current is above a preset level for a prescribed length of time.

In FIG. 1 the currents sensed by the current transformers 13 to 16 are, in turn, connected to intermediate current transformer means 20 shown schematically in FIG. 1. Block 21 connected to the current transformer 20 is a current-to-voltage converter which produces an output which is a voltage related to the current measured by the intermediate current transformer 20. The scale of the current-to-voltage converter 21 is controlled by a suitable tap select device 22. The output of the current-to-voltage converter 21 is applied to a voltage regulator 23 which provides the power for the magnetic latch 12 and also provides voltage to other circuit elements as will be later disclosed. The power to the magnetic latch 12 is controlled by the firing of a suitable controlled rectifier (SCR) trip circuit 24.

The output of current transformer 20 is connected to several individual circuits including the long time pickup circuit 25, the instantaneous pickup circuit 26 and the short time pickup circuit 27. Each of these circuits has a suitable level select tap means 28, 29 and 30, respectively. The output of the intermediate current transformer 20 is analyzed to determine the zone of the fault signal and to determine the mode of operation of the trip device; either in the long time pickup, instantaneous pickup or short time pickup mode, respectively.

The output of transformer 20 is also directly connected to the long time delay circuit to provide a time delay proportional to the inverse square of the overload current which is used to operate the long time trip system. The latter delay is chosen to aid in coordination between different circuit breakers within a particular protective system.

In a like manner, ground current is sensed and fed through a ground intermediate current transformer 40 and applied to a respective current-to-voltage converter 41. A suitable pickup circuit 42 (which has a suitable level select adjustment 43) is associated with a ground time delay circuit 44. Ground time select circuit 44 has a time select adjustment 45 such that the time delay 44 is started after the voltage from the converter 41 exceeds some preset level. After this time delay, a trip signal is delivered to the SCR trip circuit 24 to operate the circuit breaker.

The long time delay circuit 50 is connected to a long time trip detector 51 which, after a preselected length of time has elapsed, will apply a signal to the SCR trip circuit 24 to trip the magnetic latch 12 under a long time fault current condition. Circuit 51 will also cause the operation of a suitable long time target 52 which will indicate that the circuit was tripped due to a long time fault signal. The long time delay circuit 50 is also associated with a suitable long time delay extender circuit 53 which may be adjusted by a suitable time band select tap system 54.

The instantaneous pickup circuit 26 is also operable to deliver a signal to the SCR trip circuit 24 when the fault current magnitude calls for instantaneous trip. The instantaneous pickup circuit 26 also operates a suitable instantaneous target 60 which indicates that the circuit has tripped due to an instantaneous current fault.

The short time pickup circuit 27 is associated with a short time delay circuit 62 which can deliver its output signal to the SCR trip circuit 24 when the fault condition monitored is due to a short time delay. The short time delay circuit is also connected to a short time target 63 which indicates the reason for tripping the circuit and is further associated with a suitable time select tap system 64.

Finally, the ground time delay circuit 45 can operate a ground target 65 which operates a suitable display on the control panel of the trip device to indicate tripping due to a ground fault when the tripping is due to this cause.

The targets 52, 60, 63 and 65 may be conventional electromagnetic target structures well known in the art and which turn red, for example, upon their energization. For example, the targets can be of the type disclosed in U.S. Pat. No. 3,735,215 which is assigned to the assignee of this application. Adjustments are made available to the user of the device to adjust the range of pickup and time delay band for each of the zones. Note that the time delay for the short time zone and ground zone can be one of three fixed values while the instantaneous zone has no time delay circuit.

As will also be later described, each of the zones is associated with a test position which can be used to disable the function, thereby enabling the test of the relay for the particular function.

Figure 2:
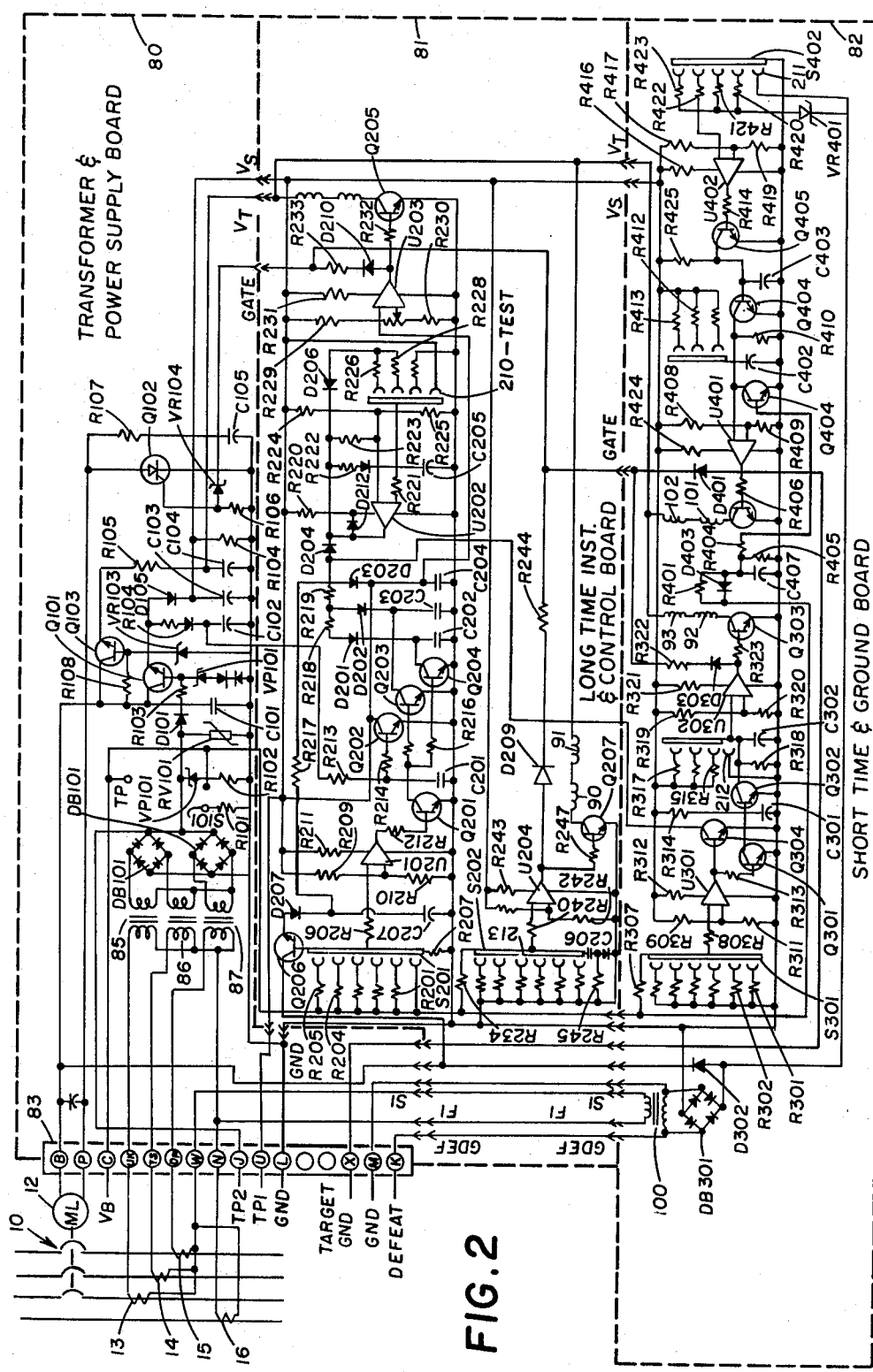
FIG. 2 is a detailed schematic diagram of the novel static device of the present invention.

FIG. 2 is a detailed schematic diagram of a particular circuit constructed in accordance with the invention wherein components similar to those of FIG. 1 are shown in detail and wherein similar components have been given identical identifying numerals.

The novel circuit of FIG. 2 utilizes principally integrated circuit techniques which substantially decrease the current necessary from the power supply. The circuit consists of three essential sections on three different boards. These include the transformer and power supply board 80; the long time instantaneous and control board 81 and the short time and ground board 82. Each of the boards referred to above is contained within the dotted line identified by the appropriate identifying numeral. All of the outputs of transformer windings 13 to 16 and of magnetic latch 12 and a few of the inputs to be described are connected to an appropraite terminal block 83.

Referring first to the input circuit in FIG. 2, it is seen that current from the primary current path sensors 13 to 16 is applied to the corresponding intermediate current transformers 85, 86 and 87. These reduce the current magnitude and feed the signal into the diode bridges DB101 and DB102. The full wave rectified output current of the bridges DB101 and DB102 is then applied through the zener diode VR101 to the resistor R102. Thus, the voltage across resistor R102 is directly proportional to the magnitude of the primary current. This will then be the burden voltage of the current transformer output.

In order to switch ranges, it is possible to close the switch S101 to connect resistor R101 in parallel with resistor R102. Resistors R101 and R102 may be approximately equal in size.

One of the unique sections of the novel circuit of FIG. 2 is the novel power supply arrangement. This novel power supply arrangement uses the series zener VR101 in series with the sensing resistor R102 (and R101 if switch S101 is closed). This simple approach assures that the voltage supplied to the capacitor C101 will always be high enough to establish the power supply voltage. A suitable varistor RV101 is also connected in parallel with capacitor C101.

The power supply next includes two series transistor regulators. These transistor regulators include the regulator containing transistor Q101 which supplies circuit current while the regulator including transistor Q103 supplies target current for the various targets. The transistors Q101 and Q103 are parts of conventional series transistor regulators which further include diodes D101, D102, D103, D104 and D105; zener diodes VR101, VR102 and VR103; resistors R103, R104, R105, R108 and R109; and capacitors C101, C102, C103 and C104.

The instantaneous trip circuit shown in FIG. 2 consists of a voltage level detecting circuit which includes amplifier U204. The burden voltage $V_B$ is impressed on the input of amplifier U204 through a resistor divider network consisting of resistor R234 and any of the resistors from resistor R235 to R239 and resistor R248. A tap block S202 is provided to set a desired resistor combination by inserting a conventional pin into an appropriate pin location to cause the circuit to trip at a corresponding current level. A circuit consisting of capacitor C206, diode D208 and resistor R245 is connected to the tap block and is provided for transient suppression.

In operation of the instantaneous circuit, when the burden voltage $V_B$ rises above the set level, pin 3 of amplifier of U204 will be higher than pin 2 and will cause pin 6 to go high. This then powers transistor Q207 to set the target by energizing target coils 90 and 91 of the instantaneous trip target. This also provides gate current to the main controlled rectifier Q102 so that the controlled rectifier Q102 fires and energizes the magnetic latch 12.

Consider next the short time circuit function. In a manner similar to that of the instantaneous circuit, the short time circuit receives the burden voltage $V_B$ through resistor combinations consisting of resistor R307 and one of the graduated resistors R301 of the tap block. The customer will select the pickup level through the tap block S301, whereby the insertion of a suitable pin in one of the tap block locations will select one of the resistors of the combination.

Since the output of amplifier U301 may be a pulsed wave form, a 60 Hertz filter is employed consisting of resistors R313, Q301, C301, R314 and Q302. Once the input signal goes above the set level, pin 6 of amplifier U301 goes high and the time delay circuit is enabled.

The time delay circuit consists of a resistance-capacitance charging network which includes capacitor C302 with either resistor R315, resistor R316 or resistor R317. The amplifier U302 is used as a level detector in this circuit. Thus, if the burden voltage $V_B$ has been above the threshold level of amplifier U302, pin 6 of amplifier U302 will go high. This will energize the target coils 92 and 93 through transistor Q303 and will fire the controlled rectifier Q102 through diode D303, resistor R322 and zener diode VR104.

The ground fault monitoring circuit consists of the various components in the 400 series located at the lower right-hand section of FIG. 2. It will be seen that this circuit is essentially identical to the short time circuit except that it receives its signal from the current flowing in the ground current path rather than from the primary burden voltage $V_B$. Thus, in the ground circuit, ground current is fed to resistors R420, R421 or R423 through intermediate transformer 100 and diode bridge DB301. The voltage across the selected resistors R420 through R423, which is selected by inserting an appropriate pin in the tap block S402, will be directly proportional to the amount of the ground current. If the voltage goes above the preset level for a long enough period of time, the controlled rectifier Q102 will be energized and the ground target coils 101 and 102 will be energized to indicate the nature of the fault and the reason for the tripping of the breaker 10. The various components used in the ground circuit include resistors R401 through R420 which are connected as illustrated and are essentially identical to the arrangement used in the short time circuit. Thus the circuit further includes transistors Q402 through Q405, amplifiers U401 and U402 and the zener diode VR401. Like the short time circuit, a tap block S401, corresponding to tap block S302 in the short time circuit, is provided to set either maximum instantaneous or minimum time delays for the circuit function.

Referring next to the long time circuit, it will be seen that the long time circuit consists of all of the 200 series components shown in the drawing of FIG. 2.

The pickup circuit for the long time circuit is essentially identical to the pickup circuits previously described and is comprised of a resistor-divider network employing resistor R201 through resistor 207. Amplifier U201 is used as a level detector. As in the case of the short time circuit, a 60 Hertz filter is provided consisting of resistor R212, transistor Q201, capacitor C201, resistors R213 through R216 and transistors Q202, Q203 and Q204. By placing a pin in the appropriate location in the tap block S201, the long time pickup unit is appropriately calibrated.

In operation of the long time circuit, when the burden voltage $V_B$ rises above the level required to raise the voltage of pin 3 of amplifier U201 above the voltage at pin 2, its pin 6 will go high, thereby energizing transistor Q201 which removes base current from transistors Q202, Q203 and Q204. This allows capacitors C202, C203 and C204 to charge through diodes D201, D202, D203, resistors R217, R218 and R219 since the burden voltage $V_B$ is also impressed on capacitor C204 through the emitter follower circuit including transistor Q206 and diode D207. The charging circuit will then generate a time delay which is proportional to the inverse square of the voltage present at the junction of resistor R207 and the tap block, which allows the slope 2 curve to shift with LT pickup.

The threshold voltage is determined by the resistor divider composed of resistors R229, R248 and R230 and the amplifier U203. When the charging voltage at capacitor C204 reaches the threshold level, pin 6 of amplifier U203 goes high to energize the target coils 203 and 204 of the long time circuit target through transistor Q205. At the same time, the circuit supplies gate current to the controlled rectifier Q102 in order to fire the controlled rectifier and cause energization of the magnetic latch 12.

The control of the three discrete ranges of the long time delay circuit is accomplished through a multivibrator circuit consisting of amplifier U202, diodes D204, D212, D205 and D206, capacitor C205 and resistors R220 through R228. The circuit is operable to extend the time delay by periodically diverting the normal charging current in a known manner.

Numerous special circuits are provided to permit a single trip circuit to be used in connection with many different circuit breaker ratings. Thus, tap positions can be provided for different circuit breaker ratings, for example, from 200 amperes to 4200 amperes. As previously pointed out, the range of the sensing current can be altered simply by closing the switch S101 to place resistor R101 in parallel with resistor R102.

It will be noted that when the primary current measured is above the short time pickup level but below the instantaneous level, transistor Q304 will prevent tripping on long time rather than short time.

A further significant circuit which is provided in FIG. 2 prevents the circuit from tripping on ground fault in the event of a high three-phase fault. This circuit consists of components R401, D403, C401, R404, R405 and Q404 which will short the ground timing capacitor and prevent ground tripping when there is a three-phase fault.

It will also be noted that the controlled rectifier Q102 may be conventionally protected against high dv/dt by the circuit including resistor R107, capacitor C105 and capacitor C100.

An important feature of the present invention is that any of the circuit functions: long time, short time, instantaneous and ground can be disabled for purposes of testing simply by placing the function tap block pin in an appropriate test position. Thus each function tap block shown in FIG. 3 is provided with a test position. For example, a long time tap block S203 has a test position 210, whereby the placement of a tap block pin in test position 210 will disable the long time function by shorting out the timing capacitors C202, C203 and C204. The same arrangement exists on the ground function tap block which has a test position 211 in the tap block S402. The short time tap block S302 is provided with a test position 212 which is so connected in the circuit that the placement of a tap block pin at position 212 will cause the pickup level to increase by about twenty times the breaker rating of the breaker 10. For the purposes of testing, therefore, the short time is effectively defeated. Moreover, if the tap pin is mistakenly left in the test position, the circuit breaker will still have some protection.

The instantaneous circuit tap block S202 is provided with a test position 213 which effectively makes the pickup level of the instantaneous circuit about twenty-four times the breaker rating. Thus, again, for purposes of testing, the function is effectively defeated.

The novel test position feature described above is particularly advantageous to operators using high current type test sets since the operator is now able to test each function independently and be assured of that function's condition.

In carrying out the novel function disabling structure, it is possible that an operator could accidentally leave a tap block pin in the test position, thereby losing the protection of that function. This problem, however, has been avoided by using a specially designed clear plexiglass front cover over the instrument which is visible from the front of the switchgear cubicle which contains the relay. Preferably, the clear plexiglass cover will be ribbed in certain areas so that an operator cannot replace the cover while a pin is in its test position.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An electronic trip circuit for a multiphase circuit breaker; said circuit including, in combination:
    current transformer means connected to each of said phases and producing an output signal related to the instantaneous current carried by said multiphase circuit breaker;
    long time, short time and instantaneous pickup circuits;
    semiconductor switching means connected to said circuit breaker and operable to trip said circuit breaker in response to the turning on of said switching means;
    long time, short time and instantaneous target indicators;
    a long time delay circuit and a short time delay circuit connected to said long time and short time pickup circuits respectively;
    said long time delay, short time delay and instantaneous pickup circuits connected to said long time, short time and instantaneous target indicators respectively;
    said long time delay, short time delay and instantaneous pickup circuits each connected to said semiconductor switching means and operable to turn on said switching means in response to respective given input current conditions;
    means for selectively disabling said long time delay circuit, said short time delay circuit and said instantaneous pickup circuit to enable the selective test of their respective functions;
    said means for selectively disabling including respective tap block means for each function having a respective removable pin position which disables said respective function.

2. The circuit of claim 1 wherein said circuit breaker includes a magnetic latch operable to trip said circuit breaker in response to the conduction of said semiconductor switching means.

3. The circuit of claim 1 wherein each of said long time pickup circuit, short time pickup circuit and instantaneous pickup circuit contain integrated circuit components and require very low operating current; said current transformer means providing the power supply for all of the components of said electronic trip circuit.

4. The circuit of claim 1, 2 or 3 which further includes constant voltage power supply circuit means including rectifier means connected to the output of said current transformer means, a zener diode and resistor connected in series with one another and connected across the d-c output of said rectifier means; said resistor defining the burden resistor for said current transformer means; the voltage drop across said zener diode providing the power supply voltage for the components of said electronic trip circuit.

5. The circuit of claim 1, 2 or 3 which further includes ground circuit means associated with said multiphase circuit breaker, a second current transformer means connected to said ground circuit means and producing an output signal related to the instantaneous current in said ground circuit means; a ground current pickup circuit connected to said second current transformer means; a ground current time delay connected to said ground current pickup circuit; said ground current pickup circuit connected to said semiconductor switching means; and a ground current target; said ground current time delay operable to operate said target and said semiconductor switching means a given time after the appearance of a given ground current.

6. The electronic trip circuit of claim 5 which further includes means for selectively and temporarily disabling said ground current time delay circuit to enable the selective test of its function.

7. The circuit of claim 1 wherein each of said tap block means has a plurality of adjustment positions for calibration of said respective function.

* * * * *